Oct. 7, 1969
F. G. LUDWIG
3,471,292
PHOTOGRAPHIC FILM WITH DEFORMED END SURFACE
AND DETACHABLE LEAD STRIP
Original Filed May 14, 1965
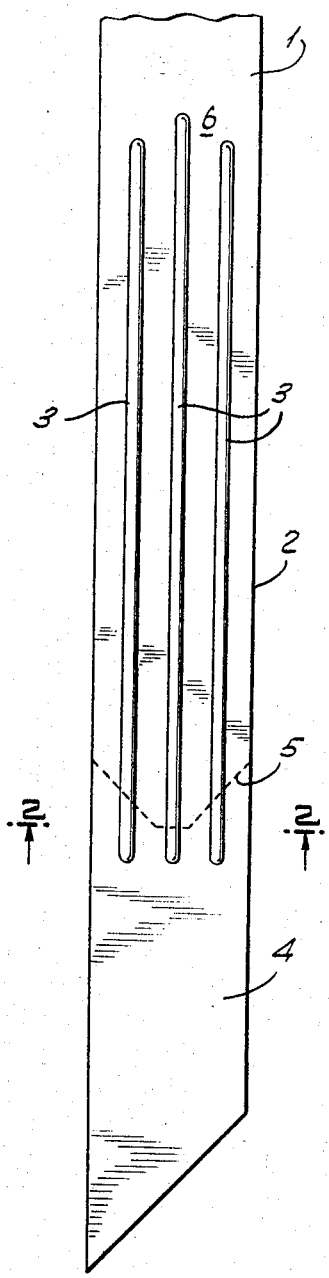
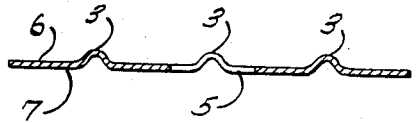
INVENTOR
FREDERIC G. LUDWIG
BY
ATTORNEYS United States Patent Office 3,471,292
Patented Oct. 7, 1969

3,471,292
PHOTOGRAPHIC FILM WITH DEFORMED END SURFACE AND DETACHABLE LEAD STRIP
Frederic G. Ludwig, Woodbridge, Conn., assignor of one-third to Albert C. Nolte, Jr., New York, N.Y.
Continuation of application Ser. No. 455,846, May 14, 1965. This application Sept. 24, 1968, Ser. No. 770,886
Int. Cl. G03c 3/02
U.S. Cl. 96—78      2 Claims

ABSTRACT OF THE DISCLOSURE

A photographic film having an end portion with a deformed surface, constituting at least one channel shaped longitudinal deformation raised above said surface, for greater rigidity. A perforation across the deformed surface facilitates the removal of a detachable portion. After the detachable portion has been removed the deformed surface reaches to the edge of the end portion and facilitates easier threading of the film.

---

This case is a continuation of Ser. No. 455,846, filed May 15, 1965, now abandoned.

This invention relates to self threading film for use in film processing equipment.

Under one of the known methods of placing photographic film into film processing equipment, the user of the film trims the end of the film and then folds a portion of this end lengthwise to form a trough or a V-shaped bend, in order to make the end substantially rigid. It is desirable to make the film more rigid to facilitate the placing of the film into the film processing equipment. A major disadvantage of this method of rigidifying film is that it simply does not work with complete reliability. Personnel using film processing equipment in banks, department stores, and similar establishments, are usually not skilled in the handling of film processing equipment and therefore, with the use of film under present known methods, it is found that the film often jams in the equipment causing hours of wasted employee time, and hours during which the film processing equipment cannot be used.

It is also known in the art to place corrugations over a portion of the film near its end leaving its end free of such corrugation, whereby said corrugation stiffens a portion of film to facilitate the insertion thereof into a reel or other film processing device. Here again, the free end without corrugation tends to curl after a period of use and would also tend to jam the machinery into which the film is being placed.

It is therefore an object of this invention to provide a film which can be placed into an apparatus for processing the film so that complete reliability of operation is assured even when the apparatus is operated by unskilled workers.

It is another object of this invention to provide film which is relatively inexpensive and simple to manufacture and which furthermore provides for complete reliability in the use of such film in the film processing apparatus.

Accordingly, a portion of the leading end of the film is molded or embossed to provide necessary rigidity into the leading end of the film. This rigidity can be placed on a portion of the film during the manufacture of the film or, alternatively an embossing apparatus may be provided with the film processor for use therewith.

The embossing may take the form of providing several ridged or corrugated surfaces in the leading edge of the film. When a film is so prepared, it then becomes possible for individuals, having no mechanical skill, to operate self threading film processing equipment, using this film, with complete assurance that there will be no difficulty and no chances of the machine becoming jammed or otherwise inoperative.

Under present methods jamming occurs with all too great a frequency, resulting in the machine being shut down for repair. The film, which is in the machine at the time of the jamming, is usually destroyed unless it is removed in total darkness. It can thus be seen that a film having an improved rigidity at the leading end will substantially improve the reliability of operation of automatic photographic processing equipment, and will greatly benefit institutions such as banks and stores which depend on said equipment.

The film is placed on an embossing mold, such as one having corrugations, and then heated until its end is deformed to match the embossing mold. A detachable flat portion may be added onto the leading end of the film ahead of the molded portion, which can be readily detached before the film is used.

A more complete understanding of this invention may be had by reference to the enclosed figures along with the specification and appended claims in which:

FIG. 1 is an enlarged top plan view of the end portion of a piece of film showing one embodiment of the invention, and FIG. 2 is a sectional view taken along line 2—2 of FIG. 1.

A photographic film strip is shown in FIG. 1 having a light sensitive portion 1 and an end portion 2 upon which a series of deformations or corrugations 3 have been molded onto the film. As shown in FIG. 2, the deformations are disposed upwards on the emulsion side 6 but it is conceivable that the deformations may be made to rise on the non-emulsified side 7 of the film. The embossing may be done on a relatively short strip of film but for optimum performance, the embossed portion should extend to the end of the film strip. For ease in handling, however, a non-molded portion 4 may extend from molded portion 2 at the end of the strip. Perforations 5 are provided across the width of the film and intersecting the corrugated portion of the film, so that non-embossed portion 4 can be easily separated from the film before its use.

The embossed corrugations are placed on the film by a process which is relatively inexpensive and simple. The end of the film is placed upon a molding which is formed in the desired shape of the corrugations and heat and pressure are then supplied to the film in contact with the molding. When the film is removed from the molding, the corrugations or similar deformations are formed into the film. The portion of the film deformed or embossed now possesses a much greater rigidity than comparable untreated film. The stiffening, so provided in the film end, prevents it from curling or bending and thereby insures ease and reliability in its use in film processing equipment.

The invention herein disclosed should not be limited to precisely the embodiment specifically described but rather by the scope of the claims herein appended.

What is claimed is:

1. A photographic film strip comprising a main longitudinal light sensitive portion having a flat surface, an end portion with a surface having at least one channel shaped longitudinal deformation raised above said surface, said deformed surface having a greater rigidity than said main portion, and a detachable leader strip having a perforated attachment to the end portion of the deformed surface of the film strip whereby when said leader strip is detached from said film strip said longitudinal deformation extends to the front edge of said end portion to facilitate threading of the film strip.

2. A photographic film strip as claimed in claim 1 wherein said detachable leader strip provided with a perforated attachment to the end portion of the deformed surface of the film strip has a major portion of the line of said perforations angular with respect to the longitudinal axis of said film strip whereby when said leader strip is detached from said film strip said end portion is pointed.

References Cited

UNITED STATES PATENTS

| | | | |
|---|---|---|---|
| 1,524,508 | 1/1925 | Cohen | 96—78 |
| 1,836,699 | 12/1931 | Wood | 96—67 |
| 2,233,010 | 2/1941 | Hipke et al. | 96—67 |
| 2,114,187 | 1/1938 | Howell | 352—235 |
| 2,626,429 | 1/1953 | Merrill. | |
| 3,178,494 | 4/1965 | Tisdale. | |

OTHER REFERENCES

Dictionary of terms of mechanical engineering. London Technical Press, 1960, p. 91.

NORMAN G. TORCHIN, Primary Examiner

C. E. DAVIS, Assistant Examiner

U.S. Cl. X.R.

96—87; 352—235